United States Patent

[11] 3,583,166

[72] Inventors Edward D. Graf
1680 Bryant St., Daly City, Calif. 94015;
Jason G. Kuhn, 11445 N. 21st Drive,
Phoenix, Ariz. 85021
[21] Appl. No. 805,895
[22] Filed Mar. 10, 1969
Division of Ser. No. 617,501, Feb. 21, 1967, abandoned
[45] Patented June 8, 1971

[54] METHOD OF STABILIZING SOILS WITH CONTROLLED GELLING OF SILICATE GROUT SOLUTIONS
3 Claims, No Drawings
[52] U.S. Cl. ............................................... 61/36
[51] Int. Cl. .......................................... E02d 3/12, E02d 3/14
[50] Field of Search........................................... 61/36; 166/292, 293; 106/74, 76, 84

[56] References Cited
UNITED STATES PATENTS

| | | | |
|---|---|---|---|
| 1,942,299 | 1/1934 | Lemmerman et al. ........ | 106/74X |
| 2,053,562 | 9/1936 | Jorgensen..................... | 61/36UX |
| 2,077,258 | 4/1937 | Pitt et al. ...................... | 106/74X |
| 2,210,545 | 8/1940 | Hamilton, Jr................. | 61/36X |
| 2,233,872 | 3/1941 | Proctor ........................ | 61/36 |
| 3,178,299 | 4/1965 | Wilborn-Eppstein ........ | 106/74X |
| 3,335,018 | 8/1967 | Peeler, Jr. et al. ............ | 106/74X |

Primary Examiner—Stephen J. Novosad
Attorney—Townsend and Townsend

ABSTRACT: Use of portland cement as a gelling agent for aqueous alkali silicate one shot grout solutions in which the amount of cement is regulated to achieve a predetermined gelling time and strength of grout after setting and in which the gelling time is also regulated by the addition of a predetermined amount of phosphoric acid.

METHOD OF STABILIZING SOILS WITH CONTROLLED GELLING OF SILICATE GROUT SOLUTIONS

This is a division of copending patent application Ser. No. 617,501 filed Feb. 21, 1967 now abandoned.

This invention relates to aqueous alkali silicate grout solutions. More particularly, the invention relates to "one shot" aqueous silicate grout solutions which contain a precombined gelling agent so that the grout is applied as a single solution containing all necessary ingredients for producing the final solidified state.

One shot or single solution liquid chemical grouting has been known and used for some time. See, for example, U.S. Pat. No. 2,176,266. As discussed in the referenced patent, the liquid chemical grout such as an aqueous sodium silicate solution is combined with a water soluble acid salt of a weak acid such as sodium bicarbonate. The precombined solution is then used for the usual grouting purposes and is applied by a suitable technique such as injection. The solution does not coagulate with precipitation of a silicate gel until the passage of some time. The referenced patent points out that the pure solution free from precipitate has a low viscosity and thereby makes it possible to obtain very good penetrations into soil.

While the silicate-bicarbonate type of solution has been used with success, it does have some disadvantages which restrict its utility. In general, the silicate-bicarbonate type of single shot grout is of relatively low strength after curing so that when higher strengths are required a different type of grout such as a cement-based grout must be utilized. In addition, while the gelling and curing times of the silicate-bicarbonate type of solution is controllable to some extent by variation in the ingredients and their amounts, in general the time involved are longer than is sometimes desirable for optimum efficiency.

The present invention provides an improvement on the above type of silicate single solution grouts. In particular, the improvement results in increases in the strength of the cured solidified product. This is accomplished with a new gelling agent for the silicate as a replacement for the bicarbonate type of gelling agent. The new gelling agent also provides extremely fast gelling and curing times while contributing to the increased strength. The time needed to gel and cure is completely controllable in the present invention in relation to the amount of gelling agent utilized and in relation to the amount of an optional sequestering agent that may be employed.

In the preferred embodiment, the invention is practiced on an aqueous solution of sodium silicate and involves mixing a calculated amount of portland cement with the silicate solution. The amount of cement is directly related to gel time of the solution and is selected to cause gelling at the desired interval following mixing of the two components. In general, the time will be long enough to permit the mixture to be applied to the substrate being treated and will be calculated to gel and cure as rapidly thereafter as possible. Through the use of varying amounts of portland cement, it has been found that a gelling time of from about 2 seconds to several hours after mixing is readily obtainable. Gelling times of a few minutes with substantial strengths being generated by the solidified grout within a matter of a few hours are common.

In a further aspect of the preferred embodiment, it has been found that application of the grouting solutions to a substrate can be facilitated if, in addition to the normal components in the grouting solution, a surface active agent is incorporated. The inclusion of any suitable surface active agent of the ionic or nonionic type will permit a faster and smoother penetration of the pores of the substrate. The improvement is observable in terms of lower pumping pressures needed for application of the grout, as well as an increase in the rate of application of the grout. These benefits are obtained with a relatively small concentration of surface active agent in the grout on the order of about 1–10 parts per million of surface active agent to grout solution. Although the incorporation of a surfactant is herein discussed in connection with the improved grouting solutions containing a cement gelling agent, it should be appreciated that surface active agents can also be used with similar advantage in other types of grouting solutions both of the cement and liquid chemical type.

The new grout solutions are applicable to many of the substrates which have heretofore been treated with grouts, including those of the single shot chemical type. For example, it is contemplated that the present solutions will find use for shutting off water in relatively coarse sands, gravel, and rock fissures and for strength stabilization of the same materials. Thus, the new material will assist in water shutoff and strengthening in areas where blasting may be employed during construction. An area where the fast gelling and curing times are of special advantage is in certain types of construction work such as tunnel construction. The fast operating materials of this invention will allow their placement and almost immediate continuation of the work by the crews at the site without costly periods of waiting for the grout to gain strength.

As noted, the present method employs a novel gelling agent in the curing of aqueous silicate grouting solutions—a portland cement. By use of the term "portland cement" it is intended to include all of the species or types of portland cement understood as falling within the scope of that term. The use of portland cement as a gelling or curing agent in this invention should be distinguished from the use of cement as a grouting material per se, as, for example, described in U.S. Pat. No. 1,547,189. A cement grout, whether accelerated or cured by an alkali silicate or any of the other types of accelerating agents conventionally used, has numerous properties which make it noncompetitive with a single-shot liquid grout in those applications where the single-shot liquid can be employed. Cement grouts tend to settle and shrink because of the normally high water-to-cement ratios employed. The shrinkage causes weak spots and potential water leakage through the channels created. For example, 11 cu. ft. of a 5 to 1 water-to-cement ratio results in only about 3 cu. ft. of set grout. In contrast, 11 cu. ft. of the present grout cured with the requisite amount of portland cement results in a full 11 cu. ft. of set grout. Absence of shrinkage without bleeding and syneresis has been observed in the present materials and these properties help avoid weak spots and possible leakage. At the same time, absence of shrinkage has the practical advantage of reducing labor and equipment costs, since so much less of the grout has to be pumped into place to accomplish the goal sought.

Cement grouts should also be distinguished from the present grout in that the usual cement grout is highly particulate in character. This particular consistency tends to cause a self-filtering action so that the grout is unable to penetrate smaller fissures in the substrate. This tends to cause a plug at the entrance to the fissure with a void behind the plug. In contrast, the present grout, although containing some portland cement as a gelling agent, has a relatively small amount of cement and is characterized by high penetration. Because gelation does not occur until the grout is in place, penetration is relatively complete and the grouted mass is far less permeable than a cement-type grout. In general, the present grouts are formulated with a sufficiently low cement concentration and have extremely high particle dispersion which allows ready penetration of coarse sands, gravels, and rock fissures over about 0.05 millimeters in width.

A particular feature and advantage of the present invention lies in the predictable and repeatable gel times that can be obtained. As noted, these may vary from about 2 seconds to several hours, for example up to about 6 hours. The gel time is directly related to the amount of portland cement employed and at a given temperature will become shorter as the cement concentration is increased. Temperature of the water of the grout solution is a significant factor. As the water temperature is increased, the gel time will be further decreased. At any given temperature the amount of portland cement utilized with a given volume of alkali silicate solution will produce a gel time that is obtainable over and over again if the same amount of cement is employed. This control over gel time, and especially the ability to shorten it to exceptionally small intervals, gives rise to the ability to prevent penetration of the grout solution beyond desirable limits. Thus, it is possible to utilize a quantity of cement which will cause a gelation to occur at a certain point of penetration at which time the viscosity increase will prevent further penetration of the grout.

As noted, the present grout provides substantial increases in strength as compared with conventionally cured silicate grout solutions. Strengths of 50 p.s.i.—200 p.s.i., as measured by an unconfined uniaxial compression test are readily obtainable with the present materials. Adequate strengths for most jobs are developed in one or two hours, while high strengths require only about 8—12 hours, and in all events full strengths are developed in less than 24 hours.

Increased strength is obtained through an increase in the amount of portland cement used for causing gelation and setting. On the basis of each 100 gallons of water present in the final grout solution, the present invention contemplates the use of from about 10 pounds to 640 pounds of portland cement, and preferably about 10 pounds to about 300 pounds thereof. The highest strengths will be obtained where the higher concentrations of cement are selected.

The alkali silicate such as sodium silicate present in the final grouting mixture can be on the order of those amounts that are conventionally found in single solution liquid silicate grouts. In the present case, it is possible to use somewhat higher concentrations of the silicate than normally encountered. For example, prior silicate grouts would normally be found to contain about 44—176 pounds of silicate solids per 100 gallons of water in the final grouting solution. In the present case, it is possible to use up to 350 pounds of silicate solids per 100 gallons of water with advantage.

In order to take advantage of the higher strengths possible with the present grouts, the higher cement quantities will be utilized. By increasing the cement concentration the gel time is decreased. In some instances, it may be that the cement concentration is so high that the gelling time becomes undesirably shortened for the particular job at hand. In this situation, the present invention provides a further improvement which permits a retardation of the gel time despite the high cement concentration. In this aspect of the invention a sequestering agent which is capable of contributing phosphate ions to the grout solution is added. To be effective, a lowering of the pH towards acid conditions, i.e., pH of about 7—10, is also required.

A convenient material for supplying phosphate at acid pH is phosphoric acid. Increasing the phosphate ion concentration serves to retard gel time. In general, phosphoric acid (in an 85 percent by volume aqueous form) is conveniently used and added to the grouting solution so as to constitute about 0.01 percent—1.50 percent by volume of the total grouting solution, In this amount a wide range and control over gel time is achieved. From this mechanism for control it will be appreciated that strength of set grout and gelling time can be preselected and by calculating the amount of cement and sequestering agent, a grout meeting all of the requirements will be readily obtainable.

The precise amounts of cement and sequestering agent for any particular job can be calculated from the information provided by a series of grouts that are prepared at different cement and sequestering agent concentrations. A convenient technique is to prepare curves with the data obtained. The requisite composition of a grout for any particular job can then be taken from the curves.

The following examples will illustrate the type of results obtainable with the present invention.

EXAMPLE I

The following composition provides a gelling time of 2.5 minutes with a water temperature of 55° F. Preferred technique is to prepare two separate solutions, one containing the alkali silicate solids and the other the portland cement. Where a sequestering agent such as phosphoric acid is utilized, it is conveniently added to the aqueous solution containing the silicate solids. When it is desired to use the grout, the two solutions are combined and the grout introduced into the substrate under treatment.

Solution 1: 30 gallons of sodium silicate (37 percent solids)
20 gallons of water
Solution 2: 46 1/25 gallons of water
90 pounds portland cement When combining the above two solutions, 100 gallons of grout solutions are obtained in which there is present 132 pounds of silicate solids, 94 pounds of portland cement, and 92 gallons of water.

EXAMPLE II

This example illustrates a grout prepared to have a relatively slower gelling time at the same water temperature of 55° F. Upon mixing the following two solutions, a gel time of 7 minutes is obtained.

Solution 1: 40 gallons aqueous solution of sodium silicate (37 percent solids)
10 gallons of water
Solution 2: 49 gallons of water
25 pounds portland cement When the above two solutions are mixed, the final grouting solution contains 176 pounds of sodium silicate solids, 94 gallons of water, and 25 pounds portland cement to make a total of 100 gallons of grouting solution ready for use.

EXAMPLE III

This example will demonstrate the increased strengths obtainable with the present silicate grouts as compared with previously used silicate grouts cured with a bicarbonate gelling agent. Two solutions containing identical amounts of sodium silicate were provided. The first solution was accelerated to gel and cure with sodium bicarbonate while the second solution was cured with portland cement in a concentration of 94 pounds of cement per 45 gallons of water in the mixed grouting solution. The first solution (gelled with sodium bicarbonate), after two days of curing, broke under a maximum applied pressure of 25 p.s.i. as measured by an unconfined uniaxial compression test. The other grouting solution containing portland cement, after only 12 hours of curing, broke at a minimum of 200 p.s.i. under the same conditions.

EXAMPLE IV

This example will illustrate that aspect of the invention by which gelling time can be retarded with a phosphate sequestering agent.

A 100 gallon mixture was prepared containing:
235 pounds portland cement
11 pounds sodium silicate solids
89 gallons of water
0.8 gallons of 85 percent phosphoric acid With a water temperature of 54° F., the gelling time of the above mix was 15 minutes. At a water temperature of 42° F., the gelling time of the above mixture was 30 minutes.

By way of comparison, the above mixture was prepared without the 0.8 gallons of phosphoric acid. With a water temperature of 54°, the gelling time was 2 minutes. Another 100 gallons of solution was prepared having a water temperature of 60° F. containing:
94 pounds portland cement
18.5 pounds sodium silicate solids
82 gallons of water The above mixture has a gelling time of 3.5 minutes.

When 0.05 percent by volume of the water content of 85 percent phosphoric acid is added, the mixture has a gelling time of 9 minutes.

When 0.17 percent by volume of the water content of the mixture of 85 percent phosphoric acid is added, the mixture has a gelling time of 60 minutes.

EXAMPLE V

This example will illustrate the advantage of incorporating a surface active agent in the grouting solution before use.

A grouting solution such as that illustrated in Example I is formulated and 3 parts per million (with respect to final mixture) of sodium hexametaphosphate is added to the solution containing the sodium silicate solids. When the final mixture was prepared and was pumped into a substrate, a pumping pressure of 80 p.s.i. was observed.

By comparison, when the same grouting solution is applied without the surface active agent, a pumping pressure of 100 p.s.i. was required to accomplish the same job. In addition, the flow rate into the substrate was substantially decreased, as compared with the flow rate of the grouting solution containing the surface active agent.

The results obtainable with the present invention are most surprising when considering both the usual behavior of cement grouts to which accelerating reagents are added, as well as the behavior of small quantities of cement added to solutions of these accelerating reagents. Calcium chloride, sodium bicarbonate, and sodium silicate are all known as materials which can be used to accelerate the set of cement. On the other hand, cement has never been used as a gelling or accelerating agent for a solid free silicate grouting solution. When a relatively small portion of cement is added to a grouting solution of calcium chloride or sodium bicarbonate, there is an immediate setting of the cement particles in the solution. The calcium chloride and sodium bicarbonate solutions are not gelled per se. The result is a liquid containing a distribution of set particles of cement. The material is not useful as a grouting solution at all. Surprisingly, when a relatively small proportion of cement is added to an alkali silicate solution, the cement does not immediately set without gelling the solution as a whole. Instead it causes a gradual, controllable gelling and thickening of the entire mixture which ultimately develops high strength, as discussed herein. Thus, while a number of solutions have been equivalently used for accelerating the set of cement, only one type of these solutions, alkali silicate solutions, can be set with a relatively small quantity of cement. When using this unique combination, the various advantages and improvements previously discussed are obtained.

Although the foregoing invention has been described in some detail by way of illustration and example for purposes of clarity of understanding, it is understood that certain changes and modifications may be practiced within the spirit of the invention, as limited only by the scope of the appended claims.

We claim:

1. In the method for stabilizing a substrate such as soil, the improvement comprising flowing a single liquid grouting solution into contact with the substrate, said solution consisting essentially of an aqueous solution of an alkali silicate, portland cement and a source of phosphate and hydrogen ions, each 100 gallons of water containing 44—350 pounds of alkali silicate, 10—640 pounds of portland cement, and a source of phosphate and hydrogen ions equivalent to 0.01—1.50 by volume of 85 percent phosphoric acid to retard the gelling time of the grouting solution.

2. The improved method in accordance with claim 1 and wherein said portland cement concentration is about 10—300 pounds per 100 gallons of water in the grouting solution.

3. The improved method in accordance with claim 1 wherein the substrate is initially open to water flow therethrough and sufficient grouting is applied to shutoff water flow.